United States Patent Office 3,376,231
Patented Apr. 2, 1968

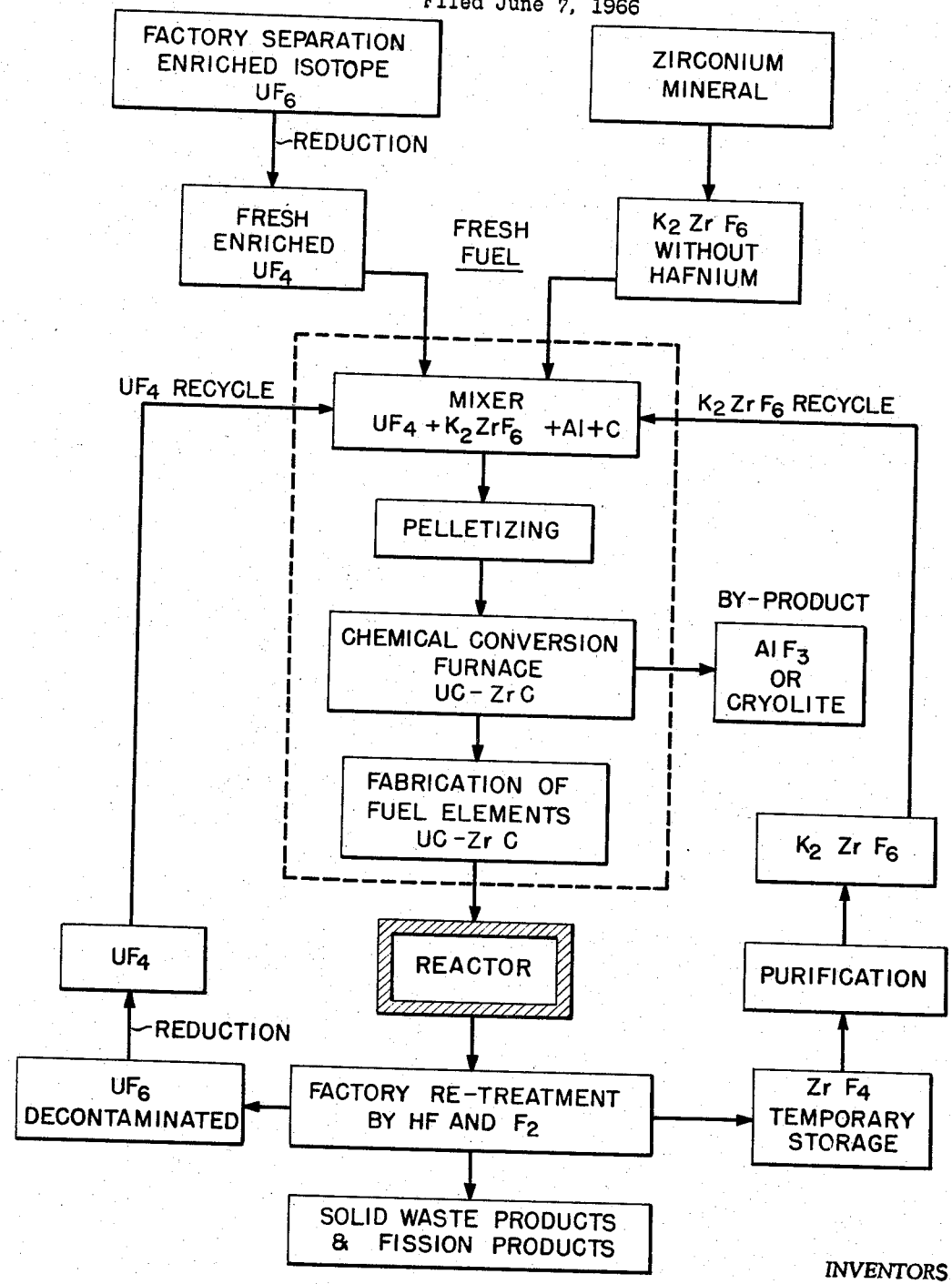
INVENTORS
Pierre Beucherie,
Joseph G. Wurm

3,376,231
PROCESS FOR THE PREPARATION OF MIXED CARBIDES
Pierre Beucherie, Biandrono, and Joseph Gerard Wurm, Varese, Italy, assignors to European Atomic Energy Community (Euratom), Brussels, Belgium
Filed June 7, 1966, Ser. No. 555,898
Claims priority, application Belgium, June 16, 1965, 14,214
4 Claims. (Cl. 252—301.1)

ABSTRACT OF THE DISCLOSURE

Mixed carbides of the types UC–ZrC and UC–NbC for use in nuclear reactors are prepared by reacting a mixture of uranium tetrafluoride, aluminum and a complex fluoride of alkali metal and a metal of Group IV–B or Group V–B. Examples of suitable complex salts are $K_2ZrF_6$, $K_2NbF_7$ and $Na_2ZrF_6$. The reaction is carried out initially at about 1400° C., in an inert atmosphere following which the temperature is raised to about 1700° C., under vacuum to complete the conversion to the desired carbide with sublimation of volatile other reaction products.

---

This invention relates to a process for the preparation of nuclear fuels which contain mixed carbides of the actinides and metals of the Groups IV–B and V–B of the Period System of elements according to the "Periodic Chart of the Elements" published by the Fisher Scientific Company and reproduced on pp. 448, 449 of the Handbook of Chemistry and Physics, 41st edition, Chemical Rubber Publishing Company.

Belgian Patent No. 652,565 of the same applicants describes a method of preparing uranium carbide using uranium tetrafluoride as starting material. Although this method of converting uranium fluorides to uranium carbide is suitable for natural uranium, it is particularly advantageous for the preparation of enriched uranium carbide. The two conventional methods of preparing uranium carbide are based on the following reactions:

(1) $UO_2 + 3C \rightarrow UC + 2CO$
(2a) $U + C \rightarrow UC$
(2b) $U + CH_4 \rightarrow UC + 2H_2$ Of these reactions, the first is undoubtedly the most economic for the preparation of natural UC because natural $UO_2$ is a cheap raw material.

The starting product used for reactions 2a and 2b is uranium metal, i.e. a processed product which is thus more expensive. Uranium metal is obtained by thermochemical reduction of $UF_4$ by Mg or Ca (the Kroll process). To convert uranium metal to carbide it has to be reduced to powder form, and this is generally done by the formation of a uranium hydride, which introduces an additional complication. This position is quite different when enriched uranium carbide is required or in the case of regeneration (tail end) or reprocessing by the fluoride volatilisation method. In both these cases the starting material for the preparation of the carbide is enriched uranium hexafluoride $UF_6$, which can readily be reduced to $UF_4$ by hydrogen in accordance with the following reaction:

(3) $UF_6 + H_2 \rightarrow UF_4 + 2HF$

Obviously in both cases the economic advantage is inclined to direct conversion of the fluorides to carbide, since the conventional oxides-carbide and metal-carbide processes extend the fuel cycle unnecessarily. These arguments in favour of chemical conversion of fluorides to carbide are also applicable to the preparation of mixed carbides of the type UC-ZrC or UC-NbC.

It is well known from literature that these mixed carbides, which together form solid solutions in any proportion, are considered to be advantageous fuels for thermal or fast breeder reactors or for thermionic converters. For example, the core of a thorium reactor of the graphite-gas type could contain an enriched seed fuel consisting of UC-ZrC or $UC_2$-ZrC mixed carbide. Ternary mixed carbides: U-Th-Zr, are also possible in some cases. Of course, uranium and thorium carbides react with their graphite coating at the high temperatures in the reactor to form dicarbides which can dissolve appreciable amounts of graphite. These changes of phase are frequently accompanied by an increase in the lattice. This disadvantage can be obviated by using only the dicarbides as fuel and also by incorporating supplementary carbon therein. However, the dicarbides are very unstable and rapidly decomposed to oxide in the presence of moisture, and this renders the preparation process difficult, and the same applies to regeneration after reprocessing. The uranium and thorium monocarbide can be stabilized by the incorporation of another stable metallic monocarbide, whose dicarbide does not exist, and this prevents the formation of uranium dicarbide under the conditions of use of the reactor. Of course, the carbide added to the matrix must satisfy neutron requirements of the reactor in question and should also preferably form a continuous solid solution with UC. Although a number of metallic carbides could satisfy this requirement, in practice only hafnium-free ZrC and NbC really do so. Other elements of the Groups IV–B and V–B of the periodic system, e.g. titanium, hafnium and tantalum, also have satisfactory characteristics.

The fuel UC-ZrC containing 30 mole percent of UC and UC-Nbc with 25 mole percent of UC, or the ternary system UC-ZrC-NbC containing 30-mole percent of UC remain perfectly stable up to 1500° C.

One method of preparing these mixed carbides has been described in French Patent No. 1,371,444. According to this patent, the mixed carbides are prepared individually and then intimately mixed, pressed into pellet form and heated to 1800° C. at which temperature the solid solution forms. If the raw material used is the metals U and Zr (or preferably their corresponding hydrides), and if they are mixed with a sufficient amount of graphite, the hot-pressed pellets are finally brought to a temperature of 1800–2000° C. in vacuo. Another possibility is carbothermal reduction of the mixture of the corresponding oxides.

According to the invention, the nuclear fuels which contain the said mixed carbides are prepared by heating a mixture of a fluoride of one or more actinides, a complex fluoride of a metal of Group I–A and of a metal of the Groups IV–B and/or V–B of the periodic system, carbon and aluminium and then separating the resulting mixed carbide from the cryolites which form.

The principle of the method of converting fluorides to carbide according to Belgian Patent No. 652,565 is therefore applied also to the preparation of binary mixed carbides, for example of the type UC-Zr-C, UC–NbC, $UC_2$-ZrC, $UC_2$-NBC, or ternary mixed carbides, e.g. UC-NbC-ZrC or $UC_2$-NbC-ZrC. Of course, the preparation of the binary mixed carbides $(Th-U)C_2$ or of the ternary type $(Th-U)C_2$-ZrC is also possible and the same applies to the preparation of the binary carbide UC-PuC, the latter being particularly advantageous for fast neutron reactors.

With regard to uranium, the reasons for preferring the fluorides as starting material have already been explained and as regards zirconium carbide there are two cases to consider, i.e.: the preparation of a fresh mixed carbide fuel or regeneration after reprocessing (volatility process).

In the zirconium industry it would appear that the halide, and more particularly the fluoride, processes are becoming increasingly more common for the extraction of ores, for the separation of Zr and Hf and the preparation of Zr metal. One method is to react zirconium dioxide ore ($ZrO_2$ sand) with a double alkaline fluoride of the type $K_3FeF_6$ in accordance with the following reaction:

(4) $4K_3FeF_6 + 3(ZrO_2 \cdot SiO_2) \rightarrow$
$3K_2ZrF_6 + 2Fe_2O_3 + 6KF + 3SiO_2$ The $K_2ZrF_6$ salt obtained is generally also accompanied by $K_2HfF_6$, but the former has the advantage of being more soluble in water so that the two salts can be separated by fractional crystallisation. The double salt $K_2ZrF_6$ can therefore be obtained directly from the ore in a high-purity state and free of hafnium. Finally, its preparation is simpler than that of $ZrO_2$ from which the hafnium has been eliminated. By comparison with other simple zirconium halides ($ZrF_4$ and $ZrCl_4$), the double salt $K_2ZrF_6$ is not sensitive to moisture and does not hydrolyse. Its handling therefore requires no special precautions. One of the features of the invention is based precisely on the fact that $K_2ZrF_6$ has thermochemical characteristics similar to those of $UF_4$, so that there is no difficulty whatever in mixing them in any proportion for the reaction for the formation of a mixed carbide. With regard to the preparation of the fresh UC-NbC fuel, it is interesting to note that the double salt $K_2NbF_7$ (from which the tantalum has been removed) has now become a very widespread industrial salt for the preparation of Nb metal. It is therefore also an advantageous raw material for the preparation of NbC.

During the retreatment of a UC-ZrC fuel by the fluoride volatilisation method, it is well known that volatile $ZrF_4$ forms, which readily separates from uranium and other fission products and which can thus be recovered and recycled. It must be emphasised, however, that the Zr fission product also mixes with the matrix zirconium and that the resulting system is very radioactive. These considerations also apply to niobium. The reason for this is that during retreatment of a mixed UC-NbC carbide by the volatilisation method, a volatile pentafluoride $NbF_5$ forms (evaporation point 220° C.), which can be recovered and converted to a double salt $K_2NbF_7$ before it is introduced into the regeneration cycle.

According to the features of the invention, mixed carbides of the type UC-ZRC or UC-NbC can be prepared by reducing a homogeneous mixture of the corresponding fluorides (for example $UF_4$ and $K_2ZrF_6$) by aluminium in the presence of graphite powder. The following are the reactions involved:

(5) $3UF_4 + 3C + 4Al \rightarrow 3UC + 4AlF_3$ (6) $3K_2ZrF_6 + 3C + 4Al \rightarrow 3ZrC + 3KAlF_4 + K_3AlF_6$ (7) $3UF_4 + 3K_2ZrF_6 + 6C + 8Al \rightarrow$
$3UC + 3ZrC + 6KAlF_4 + 2AlF_3$ Reaction No. 5 is described in the above-mentioned Belgian Patent. Reaction No. 6 relates to the formation of pure ZrC. In the latter case it is not $AlF_3$ which forms as byproduct, but a double Al and K fluoride of the cryolite family. For the total reaction (7) the solid solution UC-ZrC forms in the molecular ratio of 1, but since there is a deficit of KF, the double salt of $KalF_4$ is still accompanied by free $AlF_3$.

The reactions indicated relate to a UC-ZrC mixture in a ratio of 1, but this proportion is not limitative. If mixtures are prepared which are richer in ZrC, a larger quantity of double $KAlF_4$ salt forms, and even $AlF_6K_3$. If, on the other hand, the mixtures are richer in UC, the formation of $AlF_3$ will predominate over the double salt $KAlF_4$. It has been found that the presence of this double salt in no way interferes with the economics of the reaction, except that this double salt is less volatile than $AlF_3$ and hence its evaporation requires a higher temperature at the end of the reaction. For the formation of a UC-NbC mixed carbide the reactions are similar:

(8) $3UF_4 + 4Al + 3C \rightarrow 3UC + 4AlF_3$ (9) $3K_2NbF_7 + 5Al + 3C \rightarrow 3NbC + 4KAlF_4 + AlF_3, 2KF$ Total reaction:

(10) $3UF_4 + 3K_2NbF_7 + 9Al + 6C \rightarrow$
$(3UC + 3NbC) + 6AlF_3, KF + 3AlF_3$ The theoretical amount of Al required is greater in the case of Nb, but it is preferable to use a large excess of aluminium (30%) as compared with the stoichiometric quantity. Aluminium incidentally plays a double part as reducing agent and as adjuvant for final sintering of the mixed carbide. Normally the process according to the invention is carried out as follows:

An intimate mixture of powder of the fluorides (anhydrous), of aluminium and of graphite is introduced into a grinder in the stoichiometric proportion for each constituent, except aluminium, which is in excess. After 2–3 hours' grinding, pellets are pressed (pressure 800 kg./cm.²). These pellets are then stacked in a graphite crucible heated by high frequency in a furnace, for example the furnace according to applicants' Belgian Patent 649,461. The products are heated for 6 hours at 1400° C. in an argon atmosphere to complete the carbide formation reaction. The temperature is then raised to 1700° C. in vacuo to sublimate the volatile products ($AlF_3 + Al +$ cryolite) and complete the formation of the solid solution of the mixed carbide.

Example of charge No. 1

Formation of a ZrC-UC mixed carbide (71% of UC by weight):

|  | Grams |
|---|---|
| $K_2ZrF_6$ | 85 |
| Al (i.e. an excess of 50%) | 32.5 |
| $UF_4$ | 94.2 |
| C. | 7.2 |

Example of charge No. 2

ZrC-UC mixed carbide (20% of UC by weight):

|  | Grams |
|---|---|
| $K_2ZrF_6$ | 166 |
| Al | 34.8 |
| C graphite | 7.9 |
| $UF_4$ | 18.8 |

Example of charge No. 3

Formation of a pure ZrC carbide:

|  | Grams |
|---|---|
| $K_2ZrF_6$ | 85 |
| Al | 16.2 |
| C. | 3.6 |

Example of charge No. 4

Formation of a pure dicarbide $UC_2$:

|  | Grams |
|---|---|
| $UF_4$ | 94.2 |
| Al | 16.2 |
| C. | 7.2 |

One of the main features of the invention is that the mixed carbide obtained after the reaction is in the form of nonpyrophoric but porous sintered pellets. Experiments have shown that the excess aluminium that we add preferably to the charge is responsible for this sintering. If this excess of Al is not added, a very pyrophoric fine mixed carbide powder is obtained which is difficult to handle during melting operations. The mixed carbide pellets are finally melted in a vacuum furnace either by an electric arc or by electron bombardment. For some reactor applications, more particularly thorium reactors, these mixed carbides are used in the form of small globules (diameter 400 microns) covered with pyrocarbon. This globulisation can be carried out in a plasma torch directly from the mixed carbide sintered powder.

X-ray examination has shown that the method according to the invention can yield UC/ZrC mixed carbides in the form of solid solution in any proportions from pure UC to pure ZrC. The only thing required for this purpose is to adjust the ratio of U and Zr contained in the corresponding fluorides and of course also their carbon content. Experiments have shown that the mixed dicarbide of the type $UC_2$-ZrC can be prepared just as readily as the mixed monocarbide. To that end it is only necessary to add sufficient carbon to the feed charge. These examples are not limitative in respect of the mixed carbides mentioned. Generally, the method can be used to prepare any sample or mixed carbides of any metals whose fluorides (single or double) have similar characteristics to those of Zr and Nb, for example titanium, hafnium and tantalum.

FIGURE 1 is a complete flow sheet of a fuel cycle for a fuel containing mixed UC-ZrC carbides, retreatment of which is carried out by the fluoride volatilisation method. This flow sheet shows an example of how the method of chemically converting fluorides to carbide can be incorporated in a fuel cycle either as a head end for preparation of enriched fresh fuel or as a tail end for regeneration of fuel after treatment. Recycling of the uranium can be carried out immediately after treatment and since the decontamination factor is generally very high (order of $10^6$) for the fluoride method, regeneration by remote control is unnecessary. Glove box protection is enough. Recycling of the zirconium is different. Since its half-life is 63.3 days it has to be stored for about 3–4 years to diminish its radioactivity. A small percentage of this zirconium is then converted to stable molybdenum.

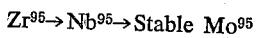

$$Zr^{95} \rightarrow Nb^{95} \rightarrow \text{Stable } Mo^{95}$$

As soon as the radioactivity of the stored $ZrF_4$ has dropped to the permissible level for manual regeneration, it is treated with fluorine at 60° C. to convert all the Mo to volatile $MoF_6$. The $ZrF_4$ purified in this way is finally mixed with KF to re-form the double salt $K_2ZrF_6$ which is then reintroduced into the fuel regeneration cycle.

A flow sheet of this type would be suitable for retreatment of the core of a thorium reactor of the seed and blanket type.

We claim:

1. A process for the preparation of nuclear fuels comprising forming a mixture of a fluoride of one or more actinides, a complex fluoride salt of a metal of Group I–A and of a metal of the Groups IV–B and/or V–B of the periodic system of elements, carbon and aluminum, heating said mixture to a reaction temperature and then recovering the resulting mixed carbide from the cryolites formed and other reaction products.

2. A process according to claim 1, wherein the amount of aluminum in the mixture is about 30% in excess of the stoichiometric quantity.

3. A process according to claim 1 for the preparation of a mixed carbide of the type U–Zr–C, wherein a homogeneous mixture of $UF_4$, $K_2ZrF_6$ or $Na_2ZrF_6$, graphite and aluminum is first heated in an inert atmosphere for some hours at about 1400° C., and then in vacuo at about 1700° C., whereby the thereby formed cryolite and aluminum fluoride and excess aluminum are separated by sublimation from the mixed carbide product.

4. A process according to claim 1 wherein the second metal of the complex fluoride is a member of the group consisting of Zr, Nb, Ti, Hf and Ta.

References Cited

UNITED STATES PATENTS

| | | | |
|---|---|---|---|
| 3,031,389 | 4/1962 | Goeddel et al. | 252—301.1 |
| 3,207,697 | 9/1965 | Benesovsky et al. | 264—.5 X |
| 3,284,550 | 11/1966 | Riley et al. | 264—.5 |

L. DEWAYNE RUTLEDGE, *Primary Examiner.*

BENJAMIN R. PADGETT, CARL D. QUARFORTH, *Examiners.*

S. J. LECHERT, JR., *Assistant Examiner.*